July 26, 1966  D. BERG  3,263,110

FLEXIBLE ELECTROLUMINESCENT CELL

Filed Jan. 28, 1963

WITNESSES

INVENTOR
Daniel Berg
BY
ATTORNEY

United States Patent Office 3,263,110
Patented July 26, 1966

3,263,110
FLEXIBLE ELECTROLUMINESCENT CELL
Daniel Berg, Churchill, Pa., assignor to Westinghouse Electric Corporation, Pittsburgh, Pa., a corporation of Pennsylvania
Filed Jan. 28, 1963, Ser. No. 254,234
8 Claims. (Cl. 313—108)

This invention relates to improvements in electroluminescent devices, and more particularly to an improved flexible electroluminescent cell and to the process for making the cell.

Generally speaking, electroluminescent lamps are made by embedding an electroluminescent phosphor in a dielectric film which has electrodes on both sides of the film. At least one of the electrodes is transparent to the light emitted by the phosphor. In the prior art, the transparent or light-transmitting electrode is generally either a transparent oxide such as tin oxide or indium oxide, or a thin metallic deposit. Where a thin metallic deposit is employed, it is difficult for the electrode to be light-transmitting while at the same time have low resistivity.

Although it has been recognized in the past that it was desirable to have a flexible electroluminescent cell which could be made to conform to various surfaces, one difficulty in making such a cell has been with the conducting transparent surface. Both the tin oxide and indium oxide require high temperature for their deposition. The types of materials on which these oxides have been successfully deposited include glasses and ceramics which can take the necessary high temperature, but which are not flexible. The difficulty with thin metallic deposits is that for low resistivity the light transmission is also low.

I have discovered that when certain organic plastics or resins of high temperature stability are used to embed electroluminescent phosphors, the resultant film of resin having electroluminescent phosphor embedded therein has characteristics which make it suitable for use in a flexible electroluminescent cell. The resins employed are stable enough to withstand the required 260° C.–345° C. short time treatment in air that an indium film or coating requires to be oxidized to conducting transparent indium oxide.

My invention also includes the use of a transparent electrode of tin oxide.

An object of the invention is to provide a new and improved electroluminescent cell characterized by flexibility.

Another object is to provide a process for making a flexible electroluminescent cell.

Figure 1:
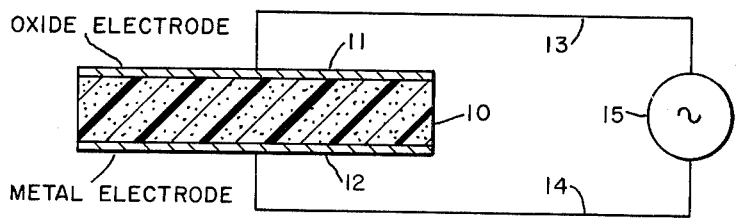
Figure 2:
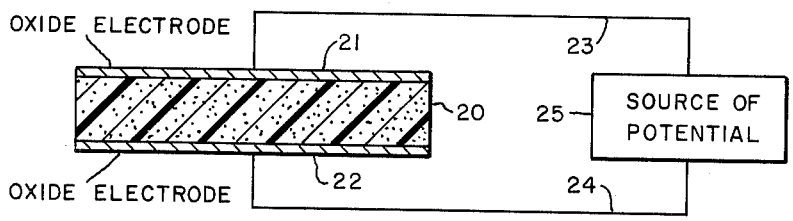

FIGURE 1 of the attached drawings is a view of the flexible electroluminescent cell of my invention according to the preferred embodiment thereof, whereas FIG. 2 is a view of the invention according to a second embodiment.

In FIG. 1, the reference numeral 10 designates a stratum of resin having an electroluminescent phosphor embedded therein. Backing 12 of aluminum forms one electrode, and coating 11 of light-transmitting indium oxide forms the other electrode. Electrodes 11 and 12 are connected by leads 13 and 14 respectively to a source of energizing potential 15.

In FIG. 2, the resin-phosphor stratum 20 has two light-transmitting electrodes 21 and 22 composed of indium oxide or tin oxide, connected by leads 23 and 24 respectively to source of energizing potential 25.

Two different classes of high-temperature resins have been found to be suitable as an embedding medium for the electroluminescent phosphors. Both of these classes are disclosed in the copending application of Lawrence W. Frost for "Linear Polymeric Polyimides," Serial No. 2,029, filed January 12, 1960, and assigned to the assignee of the instant invention.

One class of such resins is summarized as follows: Linear polymeric polyimides containing the repeating unit:

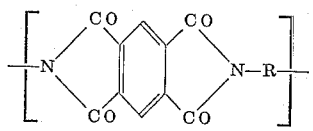

in which R represents a divalent radical selected from the group consisting of aromatic hydrocarbons, aromatic ethers, aromatic amides, aromatic esters, and aromatic sulfones.

Another class of such resins is summarized as follows: An amide-modified polyimide having the repeating unit

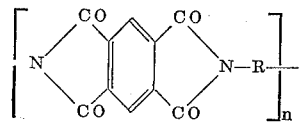

in which $n$ is an integer of at least 5 and R represents a divalent radical selected from the group consisting of

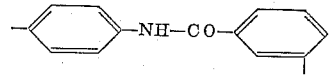

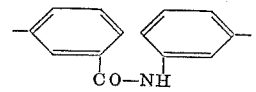

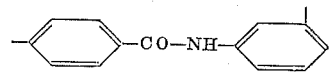

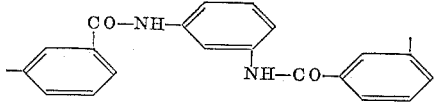

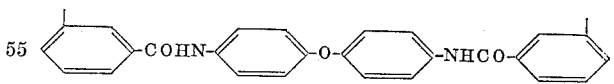

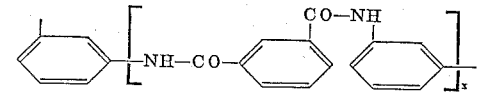

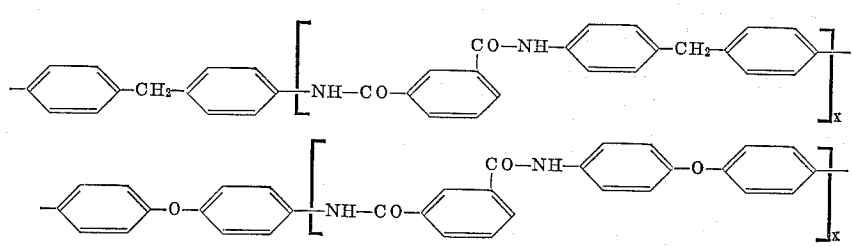

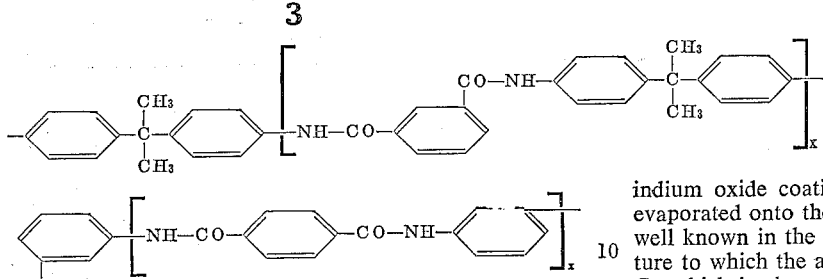

in which X in an integer of from 1 to about 500.

In making the flexible electroluminescent cell of my invention, a mixture of phosphor and resin is first made, the phosphor being finely divided, copper activated zinc sulphide electroluminescent phosphor, and the resin being one of the organic plastics or resins described in the aforementioned copending application. The weight proportions may be 3.3 phosphor to 2.0 resin. The resin portion of the mixture is then dissolved in a suitable solvent. One such suitable solvent for dissolving the resin portion of the mixture is dimethylacetamide, and the solution of the dissolved resin which contains suspended phosphor is poured on a glass mold or form. The glass form has been previously coated with a release agent such, for example, as a silicone oil, or an emulsion of polytetrafluoroethylene, or polyethylene terephthalate, the agent permitting removal of the film or stratum when the solvent has evaporated. A suitable thickness for a film or stratum used in my electroluminescent cell is 1 mil to 2.5 mils, for example, and films of this thickness can conveniently be made in this manner.

The resin-phosphor stratum, which may originally have a yellowish color provided by the resin, is placed in a metal evaporator in an atmosphere of about 1 micron of oxygen. A boat containing a small amount of indium is heated electrically to a predetermined temperature which will produce evaporation. This evaporation temperature lies between the indium melting point of approximately 156° C., and the boiling point of approximately 2000° C. A suitable temperature may be 300° C. to 800° C. In practice the temperature is adjusted to obtain the desired rate of evaporation. The temperature must not be so great as to raise the temperature of the resin to a sufficient value for a sufficient period to cause the resin to become degraded and lose its flexibility. The boat is made of an inert material with a higher melting point than the temperature at which the indium evaporates and one suitable material is tantalum. The indium evaporates in the low-pressure oxygen atmosphere and coats the resin-phosphor film or stratum, changing the initial yellowish color thereof to a greyish color indicative of the coating thereon. The indium vapor can be seen if the evaporator provides suitable means for seeing inside. The change in color of the stratum from yellowish to greyish is an indication of the coating thereon, and the color may give a rough indication of when a sufficiently thick coating has been applied. After the resin-phosphor film or stratum is coated on one side with the film or coating of partially oxidized indium, the film or stratum having the coating of indium oxide and indium on one side thereof is removed from the evaporator and placed in a 250° to 300° C. oven in air for about 1 hour. Further oxidation of the indium occurs during this heating period, which must not be too long because the resin stratum gets more and more brittle the longer it is left at the raised temperature, reducing the flexibility. The heating period cannot be too short, otherwise substantially complete oxidation of the indium does not occur. It has been found that one hour is a generally suitable period. After removal from the oven, the resin-phosphor stratum with the indium oxide coating on one side thereof is processed and in accordance with one embodiment of the invention a metal backing, which may be an aluminum backing, is evaporated onto the film or stratum on the side opposite to the light-transmitting indium oxide coating. This aluminum backing may be evaporated onto the film in a vacuum-metallizing manner well known in the art. For example, a suitable temperature to which the aluminum may be heated is about 700° C., which is above the melting point of aluminum, and a suitable pressure may be about $10^{-5}$ millimeters. The time required may be a minute or more, depending on the temperature.

The finished product is a film, stratum, or body member of electroluminescent phosphor embedded in a flexible resin having a flexible film or coating of light transmitting indium oxide on one side thereof to constitute one electrode, and a flexible film or backing of aluminum on the other side thereof to constitute the other electrode.

It has been found in practice that the films with the coatings and backings thereon are readily flexible, and can be bent easily around a ¼" mandrel.

A flexible electroluminescent cell prepared in this manner may have the following electrical characteristics:

| Voltage—60 cycle (R.M.S.): | Light—Ft. Lamberts |
| --- | --- |
| 50 | 0.14 |
| 70 | 0.25 |
| 80 | 0.31 |
| 100 | 0.50 |
| 120 | 0.70 |

One flexible electroluminescent cell made by the process of my invention had a coating of indium oxide 3½" square on a phosphor-resin film 1.5 mils thick. In the evaporator the film was placed three inches above the indium in the boat. An aluminum electrode 2⅜" in diameter was then evaporated onto the back of the film.

The resistance of the indium oxide coating was approximately 8000 ohms.

Both electrodes may be light-transmitting, as shown in FIG. 2. The coatings may be applied sequentially.

The electroluminescent phosphor may be finely divided zinc sulfide activated by copper or by copper and manganese.

The electroluminescent cell of the present invention is preferably operated by alternating electric potential. If the phosphor concentration is sufficiently high so that "phosphor bridges" are formed from electrode to electrode, the device may be operated on direct current.

As is well known in the art, a high dielectric constant is desirable for the embedding material, in order that the electric field on the phosphor may be large, to provide maximum brightness for a given alternating current potential applied to the electrodes. My invention does not exclude the use of additives to increase the dielectric constant, a practice well known in the art. One suitable additive is a small amount of finely divided barium titanate.

The preferred light-transmitting electrode materials are indium oxide or tin oxide. Small additions of other metallic oxide can be included with these preferred metallic oxides, and such other additive metallic oxides are known in the electrically conductive coating art.

It will be readily understood by those skilled in the art that subjecting the resins to excessive temperatures for prolonged periods would cause the resin to degrade or decompose, and to become more brittle. Care should be exercised to prevent this.

Other suitable metals may be employed, if desired, for the backing or opaque electrode.

Tin oxide may be used to form the transparent electrode, and may be deposited in a similar manner, account being taken of the physical properties of tin including the temperature of evaporation. The evaporation of tin in a low-pressure oxygen atmosphere to form a coating of transparent tin oxide has been described in the literature of the art.

Whereas the product has been described with reference to a film-shaped stratum, portion, or body member of the phosphor-resin mixture, it should be understood that the cell may have any desired shape, for example, even cylindrical, and that one portion of the surface has a transparent conducting oxide coating to form one electrode and another portion of the surface has another electrode of conducting material disposed thereon.

While the present invention, both process and product, have been described with respect to what, at present, are considered to be preferred forms and embodiments thereof, it will, of course, be understood that certain changes, modifications and the like may be made therein without departing from the true scope.

I claim as my invention:

1. A flexible electroluminescent light source comprising, a light-transmitting flexible resin body member of predetermined thickness and having opposing faces, finely divided electroluminescent phosphor embedded in said body member, and electrically conducting electrode layers affixed to the opposing faces of said body member, at least one of said electrode layers composed of at least one material of the group consisting of indium oxide and tin oxide.

2. A flexible electroluminescent light source comprising, a light-transmitting flexible resin body member of predetermined thickness, finely divided electroluminescent phosphor embedded in said body member, and electrically conducting electrode layers affixed to opposite faces of said body member, at least one of said electrode layers comprising at least one material of the group consisting of indium oxide and tin oxide, said flexible resin consisting essentially of linear polymeric polyimides containing the repeating unit:

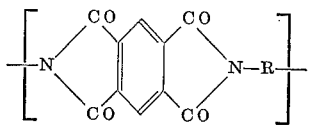

in which R represents a divalent radical selected from the group consisting of aromatic hydrocarbons, aromatic ethers, aromatic amides, aromatic esters, and aromatic sulfones.

3. A flexible electroluminescent light source comprising, a light transmitting flexible resin body member of predetermined thickness, finely divided electroluminescent phosphor embedded in said body member, and electrically conducting electrode layers affixed to opposite faces of said body member, at least one of said electrode layers comprising at least one oxide of the group consisting of indium oxide and tin oxide, said flexible resin consisting essentially of an amide-modified polyimide having the repeating unit

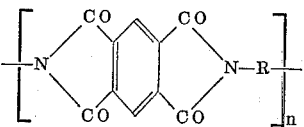

in which $n$ is an integer of at least 5 and R represents a divalent radical selected from the group consisting of

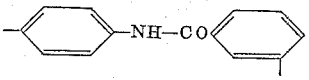

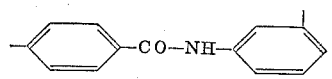

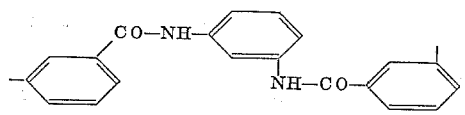

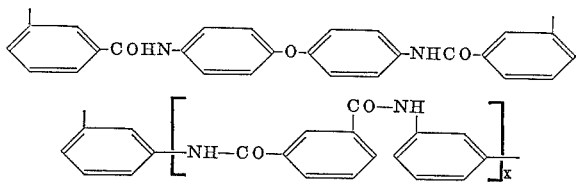

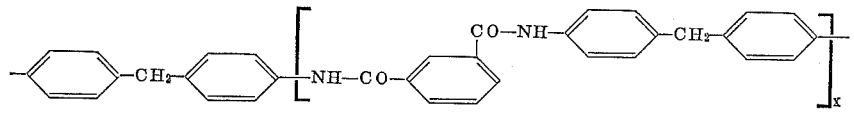

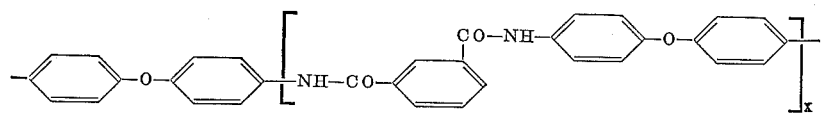

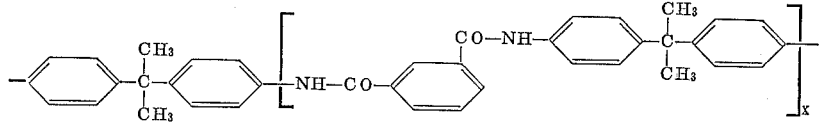

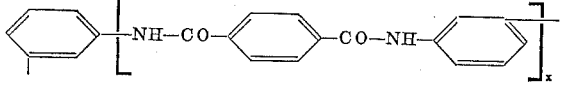

in which X is an integer of from 1 to about 500.

4. A flexible electroluminescent cell comprising, a flexible body member comprising electroluminescent phosphor embedded in a flexible resin, a flexible transparent electrically conductive coating on one portion of the surface of the body member, the coating consisting of material selected from oxides of the groups consisting of tin and indium oxide and constituting an electrode, and a flexible electrically conductive electrode on another portion of the surface of the flexible body member.

5. A flexible electroluminescent cell comprising a film formed by a mixture of a copper activated zinc sulphide electroluminescent phosphor embedded in a flexible organic plastic, a coating on one side of the film constituting a material selected from the oxides of the group consisting of indium oxide and tin oxide, said coating being transparent and electrically conductive and constituting one electrode, and a thin backing of an electrically conductive material on the other side of the film and constituting the other electrode.

6. A flexible electroluminescent cell consisting of a flexible solid member having a predetermined surface configuration and composed of an electroluminescent phosphor embedded in a flexible organic plastic of high temperature stability, a transparent coating of an oxide of a material selected from the group of materials consisting of tin oxide and indium oxide on one portion of the total surface of the member and constituting one electrode, and an opaque flexible backing of a conductive material on another portion of the surface of the member constituting the other electrode.

7. A flexible electroluminescent cell comprising a mixture of a finely divided electroluminescent phosphor in a flexible resin and forming a flexible film, an evaporated coating of flexible transparent electrically conductive indium oxide on one side of the film and constituting one electrode, and a thin backing of an electrically conductive material on the other side of the film and constituting the other electrode.

8. A flexible electroluminescent cell comprising a stratum of finely divided copper-activated zinc sulphide electroluminescent phosphor embedded in a flexible organic plastic, an indium oxide transparent coating deposited on one side of the stratum and constituting one electrode, and an opaque backing of a conductive material deposited on the other side of the stratum and constituting the other electrode.

References Cited by the Examiner
UNITED STATES PATENTS

| | | | |
|---|---|---|---|
| 2,766,144 | 10/1956 | Lidow | 117—200 |
| 2,944,177 | 7/1960 | Piper | 313—108 |
| 2,981,858 | 4/1961 | O'Connell | 313—108 |
| 3,043,978 | 7/1962 | Mager | 313—108 |
| 3,048,732 | 8/1962 | Lehman | 313—108 |
| 3,073,784 | 1/1963 | Endray | 260—78 |
| 3,110,836 | 11/1963 | Blazek et al. | 313—108 |
| 3,110,837 | 11/1963 | Wollentin | 313—108 |
| 3,124,478 | 3/1964 | Cirkler | 117—200 |
| 3,161,797 | 12/1964 | Butler et al. | 313—108 |

GEORGE N. WESTBY, *Primary Examiner.*

ROBERT SEGAL, ARTHUR GAUSS, *Examiners.*

R. JUDD, K. CROSSON, *Assistant Examiners.*